(12) United States Patent
Chen

(10) Patent No.: US 9,215,025 B2
(45) Date of Patent: Dec. 15, 2015

(54) TIME DIVISION DUPLEX TDD COMMUNICATION METHOD, BASE STATION, AND USER EQUIPMENT

(71) Applicant: HUAWEI TECHNOLOGIES CO., LTD., Shenzhen, Guangdong (CN)

(72) Inventor: Xiaobo Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 14/134,190

(22) Filed: Dec. 19, 2013

(65) Prior Publication Data

US 2014/0105077 A1 Apr. 17, 2014

Related U.S. Application Data

(63) Continuation of application No. PCT/CN2012/077221, filed on Jun. 20, 2012.

(30) Foreign Application Priority Data

Jun. 20, 2011 (CN) .......................... 2011 1 0165567

(51) Int. Cl.
*H04B 7/00* (2006.01)
*H04J 3/16* (2006.01)
(Continued)

(52) U.S. Cl.
CPC ............ *H04J 3/1694* (2013.01); *H04L 1/1861* (2013.01); *H04W 28/26* (2013.01); *H04L 5/001* (2013.01); *H04L 5/0055* (2013.01)

(58) Field of Classification Search
CPC .......... H04W 72/0446; H04W 74/002; H04W 74/004; H04W 74/006

USPC ................... 370/310, 328, 329, 345
See application file for complete search history.

(56) References Cited

U.S. PATENT DOCUMENTS 8,848,597 B2 * 9/2014 Chung et al. .................. 370/315
2009/0249153 A1 10/2009 Zhang
(Continued)

FOREIGN PATENT DOCUMENTS

CN 101378306 3/2009
CN 101500260 A 8/2009
(Continued)

OTHER PUBLICATIONS

International Search Report, dated Oct. 4, 2012, in corresponding International Application No. PCT/CN2012/077221 (4 pp.).
(Continued)

*Primary Examiner* — Dmitry H Levitan
(74) *Attorney, Agent, or Firm* — Staas & Halsey LLP

(57) ABSTRACT

The present invention discloses a time division duplex TDD communication method, including: reserving, by a base station, in a second subframe, acknowledgment channel resources for each subframe in a first subframe set, where acknowledgement channel resources reserved for at least two subframes in the first subframe set completely or partly overlap; and transmitting, by the base station, in the first subframe set, data with a first user equipment. By using the method of the present invention, because acknowledgement channel resources reserved for at least two subframes in the first subframe set completely or partly overlap, overheads of acknowledgment channel resources reserved for the first subframe set are small when there are a large quantity of subframes in the first subframe set.

20 Claims, 7 Drawing Sheets

(51) Int. Cl.
  *H04W 28/26* (2009.01)
  *H04L 1/18* (2006.01)
  *H04L 5/00* (2006.01)

(56) References Cited

U.S. PATENT DOCUMENTS

| | | |
|---|---|---|
| 2009/0268685 A1 | 10/2009 | Chen et al. |
| 2009/0274109 A1 | 11/2009 | Zhang et al. |
| 2009/0303956 A1 | 12/2009 | Chen et al. |
| 2011/0032855 A1 | 2/2011 | Kim et al. |
| 2011/0081932 A1 | 4/2011 | Astely et al. |
| 2012/0082145 A1* | 4/2012 | Chen et al. ............ 370/338 |
| 2013/0176920 A1* | 7/2013 | Seo et al. ............ 370/280 |

FOREIGN PATENT DOCUMENTS

| | | |
|---|---|---|
| CN | 101729221 A | 6/2010 |
| CN | 101926214 A | 12/2010 |
| CN | 102017500 A | 4/2011 |

OTHER PUBLICATIONS

RP-110450, "New study item proposal for Further Enhancements to LTE TDD for DL-UL Interference Management and Traffic Adaptation", Document for: Approval at *3GPP TSG-RAN Meeting #51*, Mar. 15-18, 2010, pp. 1-6, Agenda Item 14.2, CATT with Ericsson and ST-Ericsson, Kansas City, USA.

"3$^{rd}$ Generation Partnership Project; Technical Specification Group Radio Access Network; Evolved Universal Terrestrial Radio Access (E-UTRA); Physical layer procedures (Release 10)", *3GPP TS 36.213 V10.1.0 (2011-03) Technical Specification*, 2011, pp. 1-115, 3GPP Organizational Partners, Valbonne, France.

International Search Report mailed Oct. 4, 2012, in corresponding International Patent Application No. PCT/CN2012/077221.

Extended European Search Report dated Jun. 2, 2014 in corresponding European Patent Application No. 12803014.5.

"Link level investigation of ACK/NACK bundling for LTE TDD", Rahman et al., IEEE, 2009, pp. 1-5.

Chinese Office Action issued on Jul. 3, 2014 in corresponding Chinese Patent Application No. 201110165567.0.

Chinese Search Report issued on Jun. 25, 2014 in corresponding Chinese Patent Application No. 201110165567.0.

\* cited by examiner

TIME DIVISION DUPLEX TDD COMMUNICATION METHOD, BASE STATION, AND USER EQUIPMENT

CROSS-REFERENCE TO RELATED APPLICATIONS

This application is a continuation of International Application No. PCT/CN2012/077221, filed on Jun. 20, 2012, which claims priority to Chinese Patent Application No. 201110165567.0, filed on Jun. 20, 2011, both of which are hereby incorporated by reference in their entireties.

TECHNICAL FIELD

The present invention relates to the field of wireless communications, and in particular, to a time division duplex TDD communication method, a base station, and a user equipment.

BACKGROUND

In a hybrid automatic repeat request (Hybrid Automatic Repeat Request, HARQ) technology, a data receiver needs to feed back acknowledgement information to a data sender to help confirm whether data is received correctly. A value of the acknowledgement information may be ACK (Acknowledgement, acknowledgment), NACK (Negative-acknowledgement, negative-acknowledgement), and DTX (Discontinuous Transmission, discontinuous transmission), where the ACK indicates that the data is received correctly, the NACK indicates that the data is received incorrectly, and the DTX indicates that no data is received.

In a 3rd Generation Partnership Project (3rd Generation Partnership Project, 3GPP) evolved universal terrestrial radio access (Evolved Universal Terrestrial Radio Access, E-UTRA) system, in an uplink (Uplink) direction, a user equipment feeds back, through a physical uplink control channel (Physical Uplink Control Channel, PUCCH), acknowledgment information corresponding to downlink data to a network side device, for example, a base station. In a downlink (Downlink) direction, the network side device feeds back, through a physical hybrid automatic repeat request indicator channel (Physical HARQ Indicator Channel, PHICH), acknowledgment information corresponding to uplink data to the user equipment. In the present invention, the PUCCH and the PHICH used to feed back acknowledgment information are called acknowledgment channels.

The 3GPP E-UTRA system is also called a Long Term Evolution (Long Term Evolution, LTE) system, and supports two standards: frequency division duplex (Frequency Division Duplex, FDD) and time division duplex (Time Division Duplex, TDD). Generally, an LTE system supporting the TDD standard is called an LTE TDD system.

In the LTE TDD system, a typical radio frame is 10 ms long, and includes 10 subframes. Each subframe is 1 ms long, and can be configured by the network side device to transmit downlink data or uplink data. The LTE TDD system supports a plurality of different subframe ratios. As shown in Table 1, D represents a downlink subframe, S represents a special subframe, and U represents an uplink subframe. The special subframe can transmit downlink data information, but cannot transmit uplink data information, and therefore is generally processed as the downlink subframe.

TABLE 1

| Subframe ratio | Downlink-to-uplink switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

According to the subframe ratio and an HARQ timing relationship, a plurality of downlink subframes may be associated with the same uplink subframe to feed back acknowledgement information, and a plurality of uplink subframes may also be associated with the same downlink subframe to feed back acknowledgement information. That is, according to the subframe ratio and the HARQ timing relationship, the following may be set: For downlink data transmitted in a plurality of downlink subframes, acknowledgement information of the downlink data is fed back in the same uplink frame; for uplink data transmitted in a plurality of uplink subframes, acknowledgement information of the uplink data is fed back in the same downlink subframe. The HARQ timing relationship includes a timing relationship from downlink data to corresponding uplink acknowledgement information that is fed back, and a timing relationship from uplink data to corresponding downlink acknowledgement information that is fed back.

In the LTE TDD system, when a plurality of downlink subframes is associated with the same uplink subframe to feed back acknowledgement information, acknowledgement channel resources that do not mutually overlap are reserved in the uplink subframe for each associated downlink subframe. When a plurality of uplink subframes is associated with the same downlink subframe to feed back acknowledgement information, acknowledgement channel resources that do not mutually overlap are reserved in the downlink subframe for each associated uplink subframe. The foregoing design brings about the following results: When the number of uplink subframes is smaller than the number of downlink frames in the system, the number of downlink subframes associated with the same uplink subframe is large, or when the number of downlink subframes is smaller than the number of uplink subframes in the system, the number of uplink subframes associated with the same downlink subframe is large. This means that overheads of acknowledgement channel resources reserved by the system are large. For example, for subframe ratio 2 in Table 1, acknowledgement channel resources need to be reserved in each uplink subframe for four associated downlink subframes, which causes large overheads of acknowledgment channel resources.

SUMMARY

To solve a problem in the prior art that overheads of reserved acknowledgement channel resources are large, a time division duplex TDD communication method, a base station, and a user equipment are provided in multiple aspects of the present invention.

In one aspect of the present invention, a time division duplex TDD communication method is provided, including: reserving, by a base station, in a second subframe, acknowledgement channel resources for each subframe in a first subframe set, where acknowledgement channel resources reserved for at least two subframes in the first subframe set completely or partly overlap; and transmitting, by the base station, in the first subframe set, data with a first user equipment.

In another aspect of the present invention, a time division duplex TDD communication method is provided, including: obtaining, by a user equipment, acknowledgement channel resources reserved in a second subframe by a base station for each subframe in the first subframe set, where acknowledgement channel resources reserved for at least two subframes in the first subframe set completely or partly overlap; and transmitting, by the user equipment, in the first subframe set, data with the base station.

In another aspect of the present invention, a base station is provided, including: a controlling module, configured to reserve, in a second subframe, acknowledgement channel resources for each subframe in a first subframe set, where acknowledgement channel resources reserved for at least two subframes in the first subframe set completely or partly overlap; and a communicating module, configured to transmit, in the first subframe set, data with a first user equipment.

In another aspect of the present invention, a user equipment is provided, including: a controlling module, configured to obtain acknowledgement channel resources reserved in a second subframe by a base station for each subframe in the first subframe set, where acknowledgement channel resources reserved for at least two subframes in the first subframe set completely or partly overlap; and a communicating module, configured to transmit, in the first subframe set, data with the base station.

According to the technical solutions provided in all the foregoing aspects, because acknowledgement channel resources reserved for at least two subframes in the first subframe set completely or partly overlap, overheads of acknowledgement channel resources reserved for the first subframe set are small when there are a large quantity of subframes in the first subframe set.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are only a part rather than all of the embodiments of the present invention. All other embodiments obtained by a person of ordinary skill in the art based on the embodiments of the present invention without creative efforts shall fall within the protection scope of the present invention.

Figure 1:
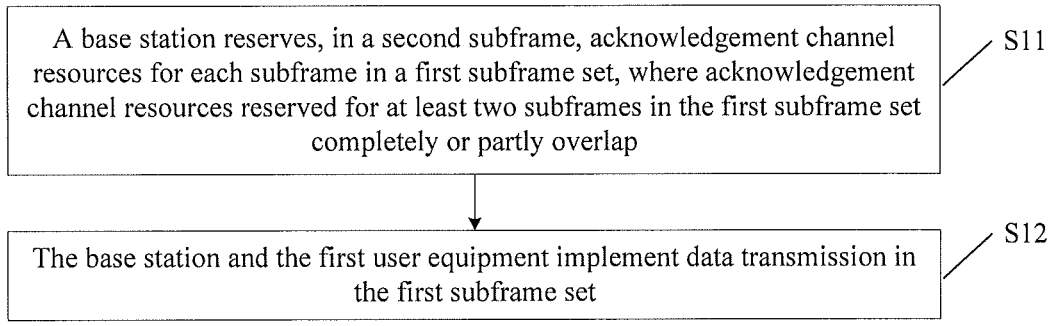
FIG. 1 is a flowchart of a time division duplex TDD communication method according to an embodiment of the present invention.

FIG. 1 is a flowchart of a time division duplex TDD communication method according to an embodiment of the present invention, where the method includes:

Step S11: A base station reserves, in a second subframe, acknowledgement channel resources for each subframe in a first subframe set, where acknowledgement channel resources reserved for at least two subframes in the first subframe set completely or partly overlap.

In an implementation manner of this embodiment, the base station communicates with a first user equipment according to a first subframe ratio. The first subframe ratio is known by the base station and the first user equipment. The first subframe ratio may be notified by the base station to the first user equipment through a message, or the first subframe ratio may be preset or configured for the base station and the first user equipment. Table 2 shows the first subframe ratio described in this implementation manner. In a radio frame, 10 subframes are D-S-U-F-F-D-S-U-F-F in sequence, where D represents a downlink subframe, S represents a special subframe, U represents an uplink subframe, and F represents a flexible subframe. The special subframe S can transmit downlink data information, but cannot transmit uplink data information, and therefore is generally processed as a downlink subframe. The flexible subframe F can be flexibly used by a network side device in real time, for example, the base station, in uplink transmission or downlink transmission according to a user's traffic requirement.

TABLE 2

| | Subframe index | | | | | | | | |
|---|---|---|---|---|---|---|---|---|---|
| 0 | 1 | 2 | 3 | 4 | 5 | 6 | 7 | 8 | 9 |
| D | S | U | F | F | D | S | U | F | F |

TABLE 3

| Subframe index | | | | | | | | | |
|---|---|---|---|---|---|---|---|---|---|
| 0 | 1 | 2 | 3 | 4 | 5 | 6 | 7 | 8 | 9 |
| D | S | U | U | D | D | S | U | U | D |

A first subframe set and a second subframe are obtained according to the first subframe ratio and an HARQ timing relationship. The base station and the first user equipment transmit data in the first subframe set, and transmit, in the second subframe, acknowledgment information corresponding to each subframe in the first subframe set. The first subframe set includes more than one subframe. The first subframe set may include an uplink subframe U, or a downlink subframe D, or a downlink subframe D and a special subframe S, or an uplink subframe U and a flexible subframe F, or a downlink subframe D and a flexible subframe F, or the following frames: a downlink subframe D, a special subframe S, and a flexible subframe F. When the first subframe set includes an uplink subframe U, or an uplink subframe U and a flexible subframe F, the second subframe is a downlink subframe D or a special subframe S or a flexible subframe F, uplink data is transmitted in the first subframe set, and downlink acknowledgement resources are reserved in the second subframe; when the first subframe set includes a downlink subframe D, or a downlink subframe D and a special subframe S, or a downlink subframe D and a flexible subframe F, or a downlink subframe D, a special subframe S, and a flexible subframe F, the second subframe is an uplink subframe U or a flexible subframe F, downlink data is transmitted in the first subframe set, and uplink acknowledgement channel resources are served in the second subframe.

The following describes a case that uplink acknowledgement information is fed back for downlink data, that is, a case that the first subframe set includes a downlink subframe D and/or a special subframe S. In this implementation manner, preferably, the first subframe set includes subframes F, D, S, and F with the subframe index numbers of 4, 5, 6, and 8, that is, subframe 4, subframe 5, subframe 6, and subframe 8. The second subframe is a subframe U with the subframe index number of 2, that is, subframe 2.

Figure 2A:
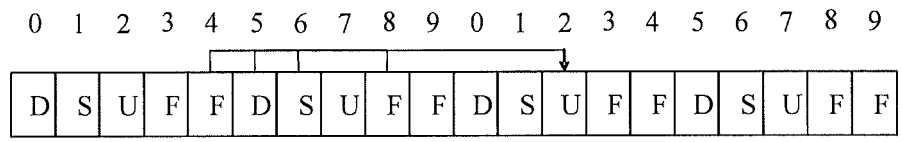
FIG. 2a is a schematic diagram of a timing relationship from downlink data to corresponding uplink acknowledgment information that is fed back under a subframe ratio shown in Table 2 according to an embodiment of the present invention.

FIG. 2a is a schematic diagram of a timing relationship from downlink data to corresponding uplink acknowledgment information that is fed back under the subframe ratio shown in Table 2. For example, in subframe 4, subframe 5, subframe 6, and subframe 8 within a previous radio frame, downlink data is transmitted between the base station and the first user equipment, that is, the base station sends downlink data to the first user equipment; in subframe 2 of a next radio frame, acknowledgement information corresponding to subframe 4, subframe 5, subframe 6, and subframe 8 within the previous radio frame is transmitted, that is, the first user equipment sends acknowledgement information to the base station. The first subframe set and the second subframe are known by the base station and the first user equipment. The first subframe set and the second subframe may be pre-configured for the base station, or the first subframe set and the second subframe may be generated by the base station according to the first subframe ratio and the HARQ timing relationship. The first subframe set and the second subframe may be pre-configured for the first user equipment, or the first subframe set and the second subframe may be notified by the base station, or the first subframe set and the second subframe may be generated according to the first subframe ratio and the HARQ timing relationship.

In this implementation manner, the base station reserves, in the second subframe, acknowledgement channel resources for each subframe in the first subframe set according to a predetermined rule. The acknowledgement channel resources refer to an acknowledgment channel region where a plurality of acknowledgement channels is included. Acknowledgement channel resources reserved by the base station for at least two subframes in the first subframe set completely or partly overlap. For example, acknowledgement channel resources reserved for subframe 8 partly overlap with acknowledgement channel resources reserved for subframe 4, subframe 5, and subframe 6, or acknowledgment channel resources reserved for subframe 4 and subframe 6 completely overlap with acknowledgment channel resources reserved for subframe 5 and subframe 8.

According to a preferred implementation manner in the foregoing implementation manners, the first subframe set is composed of a subset part and a complement part. Acknowledgement channel resources reserved for the complement part completely or partly overlap with acknowledgement channel resources reserved for the subset part. When the subset part includes more than one subframe, acknowledgment channel resources reserved by the base station for each subframe in the subset part do not mutually overlap. Preferably, the subset part is a set formed, according to the second subframe ratio and the HARQ timing relationship, by subframes with acknowledgement channel resources reserved in the second subframe. The complement part is a set formed by subframes that belong to the first subframe set but do not belong to the subset part.

In LTE TDD release 8 and release 9, one user equipment can access only one component carrier to communicate with the base station. LTE TDD release 10 supports a carrier aggregation technology, where one user equipment may access a plurality of component carriers (Component Carriers) concurrently to communicate with the base station. A component carrier is also called a serving cell (Serving Cell). When the user equipment accesses more than one component carrier concurrently, one component carrier of the more than one component carrier is set to a primary component carrier (Primary Component Carrier), which is also called a primary cell (Primary Cell). Different primary component carriers may be set for different user equipments.

When the first user equipment accesses only one component carrier, the first subframe ratio and the second subframe ratio are notified for the accessed component carrier. When the first user equipment accesses more than more component carrier concurrently, the first subframe ratio and the second subframe ratio may be notified for the same component carrier or different component carriers, for example, the second subframe ratio is notified for the primary component carrier, while the first subframe ratio is notified for at least one non-primary component carrier.

Figure 2B:
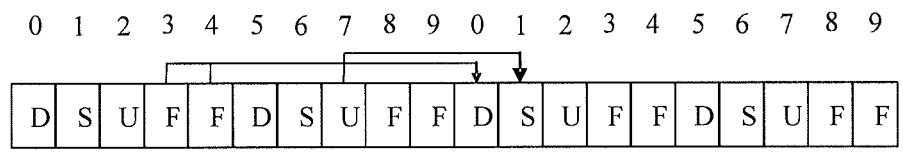
FIG. 2b is a schematic diagram of a timing relationship from uplink data to corresponding downlink acknowledgment information that is fed back under a subframe ratio shown in Table 2 according to an embodiment of the present invention.

The LTE TDD system is a system that is evolved continuously. For a user equipment supporting only an earlier release, for example, a user equipment of LTE TDD release 8 to release 10, reservation of acknowledgement resources that completely or partly overlap for different subframes is not supported. When an evolved LTE TDD base station serves a user equipment supporting a new release, for example, a user equipment of LTE TDD release 11 or later releases, the evolved LTE TDD base station also needs to serve the user equipment supporting only the earlier release. When the first subframe ratio and the second subframe ratio are notified for the same component carrier, the second subframe ratio is a subframe ratio that can be supported by the user equipment of the earlier release, for example, one of seven subframe ratios shown in Table 1; the reserving acknowledgement channel resources according to a second subframe ratio and an HARQ timing relationship refers to reserving acknowledgement channel resources according to a subframe ratio that can be supported by the user equipment of the earlier release and an HARQ timing relationship defined for the subframe ratio. Table 3 shows a second subframe ratio described in this implementation manner. The second subframe ratio is known by the base station and the first user equipment. The second subframe ratio may be notified by the base station to the first user equipment through a message, or the second subframe ratio may be preset or configured for the base station and the first user equipment. FIG. 2d is a schematic diagram of a timing relationship from downlink data to corresponding uplink acknowledgment information that is fed back, defined for the second subframe ratio shown in Table 3. According to the second subframe ratio and the HARQ timing relationship shown in FIG. 2d, uplink acknowledgment information corresponding to transmission of downlink data in subframe 5 and subframe 6 is fed back in subframe 2.

Still assuming that the first subframe ratio is the subframe ratio shown in Table 2, the subset part may include subframe 5 and subframe 6, and the complement part may include subframe 4 and subframe 8. Acknowledgement channel resources reserved for subframe 5 completely or partly overlap with acknowledgement channel resources reserved for subframe 4, and acknowledgement channel resources reserved for subframe 6 completely or partly overlap with acknowledgement channel resources reserved for subframe 8. Of course, acknowledgement channel resources reserved for subframe 5 may also completely or partly overlap with acknowledgement channel resources reserved for subframe 8, and acknowledgement channel resources reserved for subframe 4 may completely or partly overlap with acknowledgement channel resources reserved for subframe 6. Acknowledgement channel resources reserved for subframe 5 and subframe 6 do not mutually overlap.

The following describes advantages of the foregoing preferred implementation manner: Generally, the base station communicates, by using one subframe ratio, with a user equipment attached to the base station. When the base station communicates with a user equipment by using the first subframe ratio shown in the foregoing Table 2, if the user equipment is the first user equipment, that is, the user equipment supports reservation of acknowledgement channel resources that completely or partly overlap, the base station can normally communicate with the first user equipment. However, if the user equipment is a user equipment of an earlier release that does not support reservation of acknowledgement channel resources that completely or partly overlap, for example, a user equipment of LTE TDD release 8 to release 10, the base station cannot normally communicate with the user equipment of the earlier release. In the foregoing preferred implementation manner, because acknowledgement channel resources reserved for each subframe in the subset part do not mutually overlap, the base station can communicate with the user equipment of the earlier release at least in each subframe of the subset part. For example, if the user equipment of the earlier release communicates with the base station by using a second subframe ratio, where the second subframe ratio is, for example, the subframe ratio shown in Table 3, but the base station still communicates with the user equipment of the earlier release by using the first subframe ratio shown in Table 2, the base station can normally communicate with the user equipment of the earlier release at least in subframe 5 and subframe 6, thereby enhancing the system compatibility.

In this embodiment, the first subframe set may also be subframe 9, subframe 0, subframe 1, and subframe 3. In this case, the second subframe is subframe 7. Similarly, the subset part may include subframe 0 and subframe 1, and the complement part may include subframe 9 and subframe 3. Acknowledgement channel resources allocated to subframe 9 may be the same as acknowledgement channel resources allocated to subframe 1, and acknowledgement channel resources allocated to subframe 3 may be the same as acknowledgement channel resources allocated to subframe 0. Or, acknowledgement channel resources allocated to subframe 9 may be the same as acknowledgement channel resources allocated to subframe 0, and acknowledgement channel resources allocated to subframe 3 may be the same as acknowledgement channel resources allocated to subframe 1.

The following describes a case that downlink acknowledgement information is fed back for uplink data, that is, a case that the first subframe set includes an uplink subframe U and/or a flexible subframe F. In this implementation manner, it is still assumed that the first subframe ratio is the subframe ratio shown in Table 2. Preferably, the first subframe set includes subframes F with the subframe index numbers of 3 and 4, that is, subframe 3 and subframe 4. The second subframe is a subframe D with the subframe index number of 0, that is, subframe 0. FIG. 2b is a schematic diagram of a timing relationship from uplink data to corresponding downlink acknowledgment information that is fed back under the subframe ratio shown in Table 2. For example, in subframe 3 and subframe 4 within a previous radio subframe, uplink data is transmitted between the base station and the first user equipment, that is, the first user equipment sends uplink data to the base station; in subframe 0 within a next radio frame, acknowledgement information corresponding to subframe 3 and subframe 4 within the previous radio frame is transmitted, that is, the base station sends acknowledgement information to the first user equipment. Acknowledgement channel resources reserved by the base station for at least two subframes in the first subframe set completely or partly overlap. The acknowledgement channel resources refer to an acknowledgment channel region where a plurality of acknowledgement channels is included. For example, acknowledgement channel resources reserved for subframe 4 completely or partly overlap with acknowledgement channel resources reserved for subframe 3.

Table 4 shows a first subframe ratio described in another implementation manner of this embodiment. The first subframe ratio is subframe ratio 2 in Table 1. In a radio frame, 10 subframes are D-S-U-D-D-D-S-U-D-D in sequence.

TABLE 4

| Subframe index | | | | | | | | | |
|---|---|---|---|---|---|---|---|---|---|
| 0 | 1 | 2 | 3 | 4 | 5 | 6 | 7 | 8 | 9 |
| D | S | U | D | D | D | S | U | D | D |

A first subframe set and a second subframe are obtained according to the first subframe ratio and an HARQ timing relationship. The following firstly describes a case that uplink acknowledgement information is fed back for downlink data, that is, a case that the first subframe set includes a downlink subframe D and/or a special subframe S. Preferably, the first subframe set includes subframes D, D, S, and D with the subframe index numbers of 4, 5, 6, and 8, that is subframe 4, subframe 5, subframe 6, and subframe 8. The second subframe is a subframe U with the subframe index number of 2, that is, subframe 2. Or, the first subframe set includes subframes D, D, S and D with the subframe index numbers of 9, 0, 1, and 3. In this case, the second subframe is a subframe U with the subframe index number of 7. The case that the first subframe set includes subframes with the subframe index numbers of 4, 5, 6, and 8 is described as an example only, and other cases are similar.

Figure 2C:
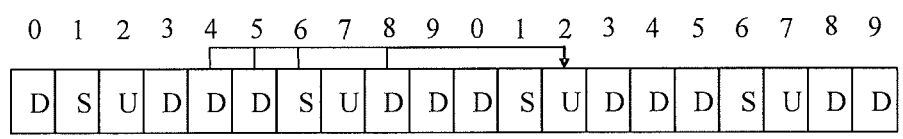
FIG. 2c is a schematic diagram of a timing relationship from downlink data to corresponding uplink acknowledgment information that is fed back under a subframe ratio shown in Table 4 according to an embodiment of the present invention.
Figure 2D:
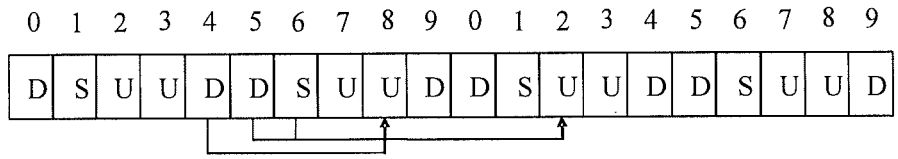
FIG. 2d is a schematic diagram of a timing relationship from downlink data to corresponding uplink acknowledgment information that is fed back under a subframe ratio shown in Table 3 according to an embodiment of the present invention.

FIG. 2c is a schematic diagram of a timing relationship from downlink data to corresponding uplink acknowledgment information that is fed back under the subframe ratio shown in Table 4. For example, downlink data in subframe 4, subframe 5, subframe 6, and subframe 8 within a previous radio frame is transmitted between the base station and the first user equipment, that is, the base station sends downlink data to the first user equipment; in subframe 2 within a next radio frame, acknowledgement information corresponding to subframe 4, subframe 5, subframe 6, and subframe 8 within the previous radio frame is transmitted, that is, the first user equipment feeds back acknowledgement information to the base station.

Preferably, the first subframe set is composed of a subset part and a complement part. Acknowledgement channel resources reserved for the complement part completely or partly overlap with acknowledgement channel resources reserved for the subset part. When the subset part includes more than one subframe, acknowledgment channel resources reserved by the base station for each subframe in the subset part do not mutually overlap. Preferably, the subset part is a set formed, according to the second subframe ratio and the HARQ timing relationship, by subframes with acknowledgement channel resources reserved in the second subframe. The complement part is a set formed by subframes that belong to the first subframe set but do not belong to the subset part.

In LTE TDD release 8 and release 9, one user equipment can access only one component carrier to communicate with the base station. LIE TDD release 10 supports a carrier aggregation technology, where one user equipment may access a plurality of component carriers (Component Carriers) concurrently to communicate with the base station. A component carrier is also called a serving cell (Serving Cell). When the user equipment accesses more than one component carrier concurrently, one component carrier of the more than one component carrier is set to a primary component carrier (Primary Component Carrier), which is also called a primary cell (Primary Cell). Different primary component carriers may be set for different user equipments.

When the first user equipment accesses only one component carrier, the first subframe ratio and the second subframe ratio are notified for the accessed component carrier. When the first user equipment accesses more than more component carrier concurrently, the first subframe ratio and the second subframe ratio may be notified for the same component carrier or different component carriers, for example, the second subframe ratio is notified for the primary component carrier, while the first subframe ratio is notified for at least one non-primary component carrier.

The LTE TDD system is a system that is evolved continuously. A user equipment supporting only an earlier release, for example, a user equipment of LTE TDD release 8 to release 10 does not support reservation of acknowledgement resources that completely or partly overlap for different subframes. When an evolved LTE TDD base station serves a user equipment supporting a new release, for example, a user equipment of LTE TDD release 11 or later releases, the evolved LTE TDD base station also needs to serve the user equipment supporting only the earlier release. When the first subframe ratio and the second subframe ratio are notified for the same component carrier, the second subframe ratio is a subframe ratio that can be supported by the user equipment of the earlier release, for example, one of seven subframe ratios shown in Table 1; the reserving acknowledgement channel resources according to a second subframe ratio and an HARQ timing relationship refers to reserving acknowledgement channel resources according to a subframe ratio that can be supported by the user equipment of the earlier release and an HARQ timing relationship defined for the subframe ratio. Table 3 shows a second subframe ratio described in this implementation manner. The second subframe ratio is known by the base station and the first user equipment. The second subframe ratio may be notified by the base station to the first user equipment through a message, or the second subframe ratio may be preset or configured for the base station and the first user equipment. FIG. 2d is a schematic diagram of a timing relationship from downlink data to corresponding uplink acknowledgment information that is fed back, defined for the second subframe ratio shown in Table 3. According to the second subframe ratio and the HARQ timing relationship shown in FIG. 2d, uplink acknowledgment information corresponding to transmission of downlink data in subframe 5 and subframe 6 is fed back in subframe 2.

Still assuming that the first subframe ratio is the subframe ratio shown in Table 4, the subset part may include subframe 5 and subframe 6, and the complement part may include subframe 4 and subframe 8. Acknowledgement channel resources reserved for subframe 5 completely or partly overlap with acknowledgement channel resources reserved for subframe 4, and acknowledgement channel resources reserved for subframe 6 completely or partly overlap with acknowledgement channel resources reserved for subframe 8. Of course, acknowledgement channel resources reserved for subframe 5 may also completely or partly overlap with acknowledgement channel resources reserved for subframe 8, and acknowledgement channel resources reserved for subframe 4 may completely or partly overlap with acknowledgement channel resources reserved for subframe 6. Acknowledgement channel resources reserved for subframe 5 and subframe 6 do not mutually overlap.

Non-overlapping of acknowledgement channel resources reserved for each subframe in the subset part has the following advantages: When a user equipment of an earlier release, for example, a user equipment of LTE TDD release 8 to release 10 does not support reservation of acknowledgement channel resources that completely or partly overlap, the user equipment of the earlier release can communicate with the base station by using the subframe ratio shown in Table 3, but the base station still communicates with the user equipment of the earlier release by using the first subframe ratio shown in Table 4. In this case, the base station can normally communicate with the user equipment of the earlier release at least in subframe 5 and subframe 6, thereby enhancing the system compatibility.

FIG. 2a to FIG. 2d illustrate only the preferred first subframe ratio and HARQ timing relationship provided in each embodiment of the present invention. Apparently, the method provided in each embodiment of the present invention is also applicable to the setting of other uplink/downlink subframe ratios and HARQ timing relationships.

Step S12: The base station and the first user equipment implement data transmission in the first subframe set, and implement, in the second subframe, transmission of acknowledgement information corresponding to the data transmission.

In an implementation manner of this embodiment, the base station and the first user equipment implement data transmission in the first subframe set, and implement, in the second subframe, transmission of acknowledgement information corresponding to the data transmission in the first subframe set.

In the foregoing preferred implementation manner of this embodiment, when acknowledgement channel resources reserved by the base station for each subframe in the subset part do not mutually overlap, the base station can further transmit data in the subset part with a user equipment of an earlier release, and transmit, in the second subframe, acknowledgement information corresponding to the subset part.

When the solution provided in this embodiment is not used, for example, according to the subframe ratio shown in Table 4, acknowledgement channel resources that do not mutually overlap need to be reserved in subframe 2 for four downlink subframes. It can be seen that by using the solution provided in this embodiment, acknowledgement channel resources reserved in subframe 2 can be reduced by 50%. Using 20 MHz LTE TDD as an example, acknowledgement channel resources reserved for each downlink subframe are formed by 88 acknowledgement channels. When acknowledgement channel resources that do not mutually overlap are reserved in one uplink subframe for four downlink subframes, a total of 352 acknowledgement channels need to be reserved, which is generally equivalent to 19.56% system bandwidth resources under a short-cycle prefix subframe structure. When acknowledgement channel resources that do not mutually overlap are reserved in one uplink subframe for two downlink subframes, a total of 176 acknowledgement channels need to be reserved, which is generally equivalent to 9.78% system bandwidth resources under the short-cycle prefix subframe structure. It can be seen that after the solution provided in this embodiment is used, overheads of acknowledgment channel resources can be greatly reduced, and the saved 9.78% system bandwidth resources can be used in uplink data transmission, thereby effectively improving user experience in uplink communication.

Figure 3:
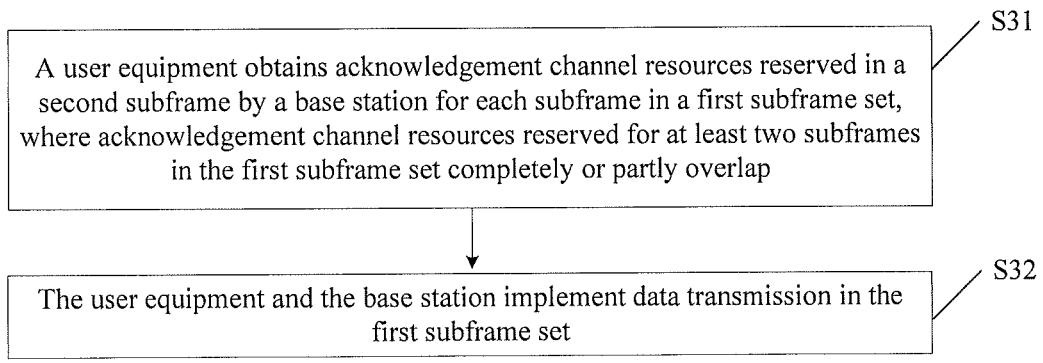
FIG. 3 is a flowchart of a time division duplex TDD communication method according to another embodiment of the present invention.

FIG. 3 is a flowchart of a time division duplex TDD communication method according to another embodiment of the present invention, where the method includes:

Step S31: A user equipment obtains acknowledgement channel resources reserved in a second subframe by a base station for each subframe in a first subframe set, where acknowledgement channel resources reserved for at least two subframes in the first subframe set completely or partly overlap.

In an implementation manner of this embodiment, a predetermined rule used by the base station to reserve acknowledgement channel resources for each subframe in the first subframe set is also known by the user equipment, for example, the rule may be preset on the user equipment. Therefore, if the user equipment obtains a start position or an end position of acknowledgement channel resources reserved by the base station for the first subframe set, acknowledgement channel resources reserved in the second subframe by the base station for each subframe in the first subframe set can be computed according to the rule. The user equipment may receive, through a broadcast message, an offset value $N_{PUCCH}^{(1)}$ sent by the base station, where the offset value $N_{PUCCH}^{(1)}$ represents the start position or the end position of acknowledgement channel resources reserved by the base station for the first subframe set. The user equipment obtains, according to the received offset value $N_{PUCCH}^{(1)}$, acknowledgement channel resources reserved in the second subframe by the base station for each subframe in the first subframe set.

Step S32: The user equipment and the base station implement data transmission in the first subframe set, and implement, in the second subframe, transmission of acknowledgement information corresponding to the data transmission.

By using the method provided in each of the foregoing embodiments, because acknowledgement channel resources reserved for at least two subframes in the first subframe set completely or partly overlap, overheads of acknowledgement channel resources reserved for the first subframe set are small when there are a large quantity of subframes in the first subframe set.

Figure 4:
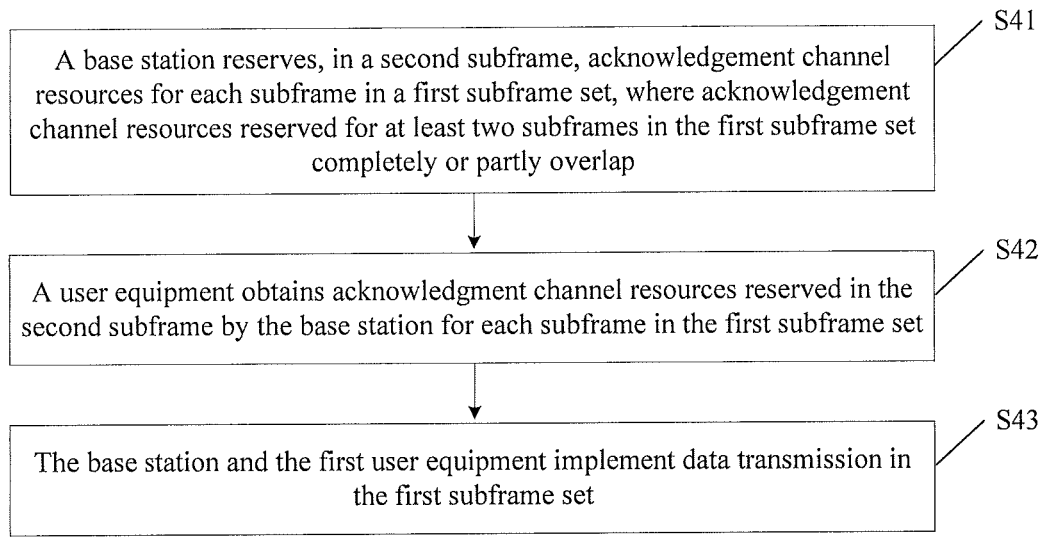
FIG. 4 is a flowchart of a time division duplex TDD communication method according to another embodiment of the present invention.

FIG. 4 is a flowchart of a time division duplex TDD communication method according to another embodiment of the present invention, where the method includes:

Step S41: A base station reserves, in a second subframe, acknowledgement channel resources for each subframe in a first subframe set, where acknowledgement channel resources reserved for at least two subframes in the first subframe set completely or partly overlap.

The first subframe set includes a subset part and a complement part, where acknowledgement channel resources reserved for the complement part completely or partly overlap with acknowledgement channel resources reserved for the subset part, and when the subset part includes more than one subframe, acknowledgement channel resources reserved by the base station for each subframe in the subset part do not mutually overlap.

For details about the implementation manner of step S41, reference may be made to step S11, which is not further described herein.

Step S42: A first user equipment obtains acknowledgment channel resources reserved in the second subframe by the base station for each subframe in the first subframe set.

For details about the implementation manner of step S42, reference may be made to step S31, which is not further described herein.

Step S43: The base station and the first user equipment implement data transmission in the first subframe set, and implement, in the second subframe, transmission of acknowledgement information corresponding to the data transmission.

Figure 5:
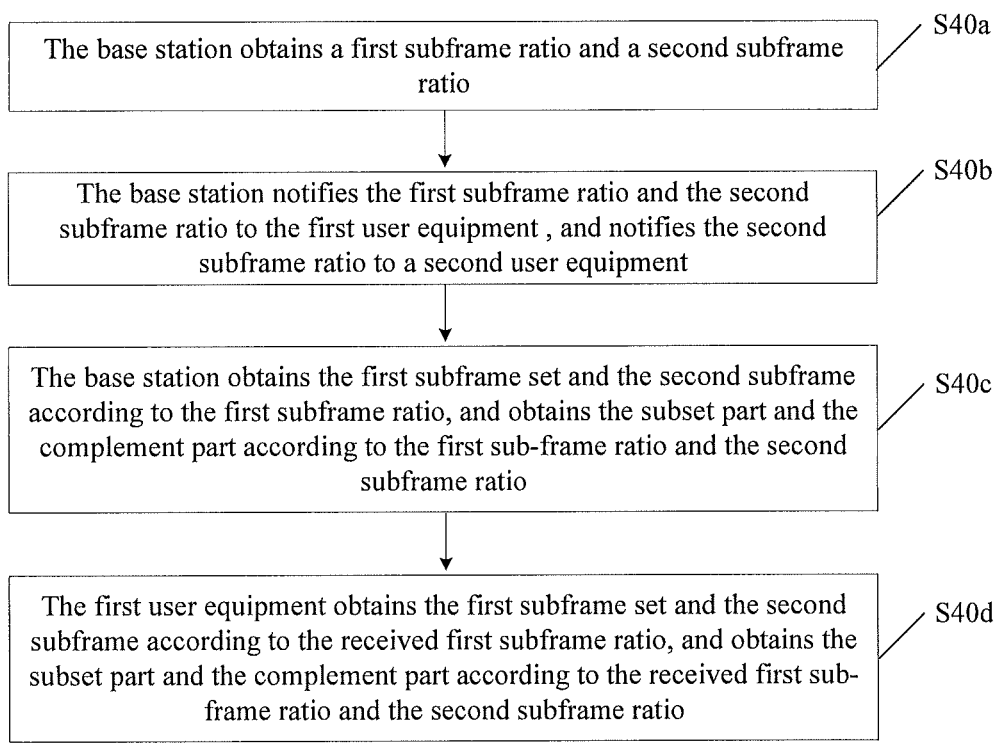
FIG. 5 is a flowchart of a time division duplex TDD communication method according to another embodiment of the present invention.

FIG. 5 is a flowchart of a time division duplex TDD communication method according to another embodiment of the present invention. The method provided in this embodiment is basically the same as the method provided in the embodiment shown in FIG. 4, with a difference only in the following: Before step S41, the method further includes:

Step S40a: The base station obtains a first subframe ratio and a second subframe ratio.

The first subframe ratio and the second subframe ratio may be pre-stored in the base station, and read by the base station, or the first subframe ratio and the second subframe ratio may be configured by other network devices for the base station. For example, the first subframe ratio may be the subframe ratio shown in Table 2, and the second subframe ratio may be the subframe ratio shown in Table 3. In another example, the first subframe ratio may be the subframe ratio shown in Table 4, and the second subframe ratio may be the subframe ratio shown in Table 3.

Step S40b: The base station notifies the first subframe ratio and the second subframe ratio to the first user equipment, and notifies the second subframe ratio to a second user equipment.

It should be noted herein that the first user equipment is a device supporting reservation of acknowledgement channel resources that completely or partly overlap, while the second user equipment is a device not supporting reservation of acknowledgement channel resources that completely or partly overlap.

In LTE TDD release 8 and release 9, one user equipment can access only one component carrier to communicate with the base station. LIE TDD release 10 supports a carrier aggregation technology, where one user equipment may access a plurality of component carriers (Component Carriers) concurrently to communicate with the base station. A component carrier is also called a serving cell (Serving Cell). When the user equipment accesses more than one component carrier concurrently, one component carrier of the more than one component carrier is set to a primary component carrier (Primary Component Carrier), which is also called a primary cell (Primary Cell). Different primary component carriers may be set for different user equipments.

When the first user equipment accesses only one component carrier, the first subframe ratio and the second subframe ratio are notified for the accessed component carrier. When the first user equipment accesses more than more component carrier concurrently, the first subframe ratio and the second subframe ratio may be notified for the same component carrier or different component carriers, for example, the second subframe ratio is notified for the primary component carrier, while the first subframe ratio is notified for at least one non-primary component carrier.

When the first subframe ratio and the second subframe ratio are notified for the same component carrier, for example, when the first user equipment and the second user equipment access only the same component carrier, the base station communicates with the first user equipment and the second user equipment according to the first subframe ratio. The first user equipment communicates with the base station according to the first subframe ratio, while the second user equipment communicates with the base station according to the second subframe ratio.

In an implementation manner of this embodiment, the first subframe ratio and the second subframe ratio respectively include uplink subframes, downlink subframes, and special subframes, where the number of uplink subframes in the first subframe ratio is smaller than the number of uplink subframes in the second subframe ratio. For example, the first subframe ratio may be the subframe ratio shown in Table 4, and the second subframe ratio may be the subframe ratio shown in Table 3.

In another implementation manner of this embodiment, the first subframe ratio includes uplink subframes, downlink subframes, special subframes, and flexible subframes, the second subframe ratio includes uplink subframes, downlink subframes, and special subframes, the complement part includes the flexible subframes, and the subset part includes the uplink subframes, or the downlink subframes, or the downlink subframes and the special subframes. For example, the first subframe ratio may be the subframe ratio shown in Table 2, and the second subframe ratio may be the subframe ratio shown in Table 3.

Step S40c: The base station obtains the first subframe set and the second subframe according to the first subframe ratio, and obtains the subset part and the complement part according to the first subframe ratio and the second subframe ratio.

As detailed above, the base station may obtain the first subframe set and the second subframe according to the first subframe ratio and the HARQ timing relationship. In addition, the base station can also obtain the subset part and the complement part in the first subframe set by using the first subframe ratio and the second subframe ratio.

The first subframe ratio is exemplarily the subframe ratio shown in Table 2, and the second subframe ratio is exemplarily the subframe ratio shown in Table 3. According to the timing relationship shown in FIG. 2a, it can be determined that when the first subframe set includes subframe 4, subframe 5, subframe 6, and subframe 8, the second subframe is subframe 2. Under the first subframe ratio, acknowledgement information corresponding to data transmitted in subframe 4, subframe 5, subframe 6, and subframe 8 is fed back in subframe 2. FIG. 2d is a schematic diagram of a timing relationship from downlink data to corresponding uplink acknowledgment information that is fed back under the subframe ratio shown in Table 3. Under the second subframe ratio, acknowledgement information corresponding to data transmitted in subframe 5 and subframe 6 is fed back in subframe 2. In this case, according to the first subframe ratio and the second subframe ratio, the subset part includes an intersection part between subframes fed back by subframe 2, in the first subframe ratio, and subframes fed back by subframe 2, in the second subframe ratio, that is, the subset part includes subframe 5 and subframe 6 and the complement part includes subframe 4 and subframe 8.

When the first user equipment accesses more than more component carrier concurrently, the first user equipment feeds back, in the primary component carrier, uplink acknowledgment information corresponding to downlink data transmission of all the accessed component carriers. When the first subframe ratio is notified for the primary component carrier and the second subframe ratio is notified for at least one non-primary component carrier, acknowledgement channel resources reserved for the complement part completely or partly overlap with acknowledgement channel resources reserved for the subset part, which can also reduce acknowledgement channel resources that need to be reserved in the primary component carrier.

Step S40d: The first user equipment obtains the first subframe set and the second subframe according to the received first subframe ratio, and obtains the subset part and the complement part according to the received first subframe ratio and the second subframe ratio.

The implementation manner of step S40d is similar to the implementation manner of step S40c, and is not further described herein.

Figure 6:
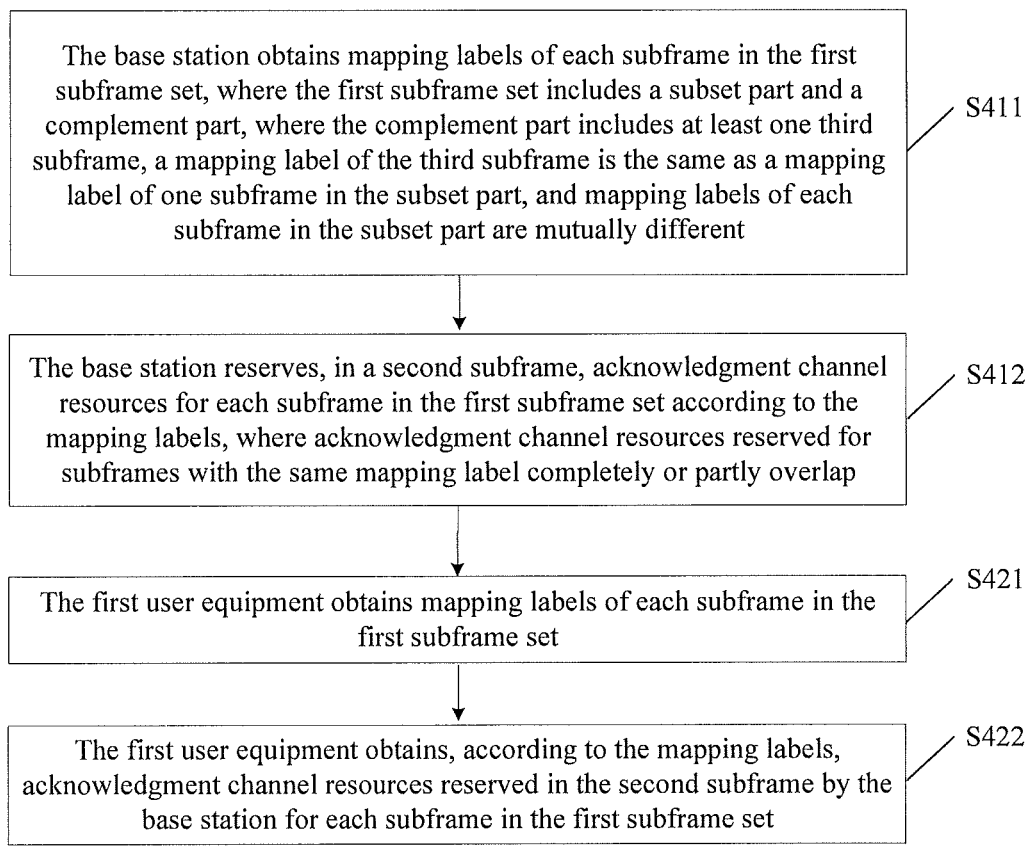
FIG. 6 is a flowchart of a time division duplex TDD communication method according to another embodiment of the present invention.

FIG. 6 is a flowchart of a time division duplex TDD communication method according to another embodiment of the present invention. The method provided in this embodiment is basically the same as the method provided in the embodiment shown in FIG. 4, with a difference only in the following: Step S41 specifically includes step S411 and step S412, and step S42 specifically includes step S421 and step S422.

Step S411: The base station obtains mapping labels of each subframe in the first subframe set, where the first subframe set includes a subset part and a complement part, where the complement part includes at least one third subframe, a mapping label of the third subframe is the same as a mapping label of one subframe in the subset part, and mapping labels of each subframe in the subset part are mutually different.

The base station obtains mapping labels pre-configured for each subframe in the first subframe set, or the base station notifies an allocated mapping label for at least one subframe in the first subframe set, or the base station obtains mapping labels pre-configured for the subset part of the first subframe set, and notifies allocated mapping labels for the complement part of the first subframe set.

Assuming that the first subframe ratio is the subframe ratio shown in Table 2, the first subframe set includes subframe 4, subframe 5, subframe 6, and subframe 8, the subset part includes subframe 5 and subframe 6, and the complement part may include subframe 4 and subframe 8. The base station may use subframe 4 and subframe 8 in the complement part as a third subframe, and the third subframe is a subframe whose mapping label is the same as mapping labels of other subframes. For example, the base station may allocate the same mapping label m=0 to subframe 4 and subframe 5, and allocate the same mapping label m=1 to subframe 6 and subframe 8. The base station may also allocate the same mapping label m=1 to subframe 4 and subframe 6, and allocate the same mapping label m=0 to subframe 5 and subframe 8.

Assuming that the first subframe ratio is the subframe ratio shown in Table 4, the first subframe set includes subframe 4, subframe 5, subframe 6, and subframe 8, the subset part may include subframe 5 and subframe 6, and the complement part may include subframe 4 and subframe 8. The base station may use subframe 4 and subframe 8 in the complement part as a third subframe. That is, the base station may allocate the mapping label m=0 to subframe 5 and subframe 4, and allocate the same mapping label m=1 to subframe 6 and subframe 8. The base station may also allocate the same mapping label m=1 to subframe 4 and subframe 6, and allocate the same mapping label m=0 to subframe 5 and subframe 8.

It should be noted that for different subframe ratios, mapping labels corresponding to each subframe in the first subframe set may be pre-stored in the base station.

Step S412: The base station reserves, in a second subframe, acknowledgment channel resources for each subframe in the first subframe set according to the mapping labels, where acknowledgment channel resources reserved for subframes with the same mapping label completely or partly overlap.

Step S421: The first user equipment obtains mapping labels of each subframe in the first subframe set.

For example, the user equipment may read mapping labels pre-configured for each subframe in the first subframe set, or the user equipment may receive an mapping label allocated to at least one subframe in the first subframe set and notified by the base station, or the user equipment may read mapping labels pre-configured for the subset part of the first subframe set, and receive mapping labels allocated to the complement part of the first subframe set and notified by the base station.

Step S422: The first user equipment obtains, according to the mapping labels, acknowledgment channel resources reserved in the second subframe by the base station for each subframe in the first subframe set.

According to the foregoing description, the first user equipment may receive, through a broadcast message, an offset value $N_{PUCCH}^{(1)}$ sent by the base station, where the offset value $N_{PUCCH}^{(1)}$ represents a start position or an end position of acknowledgement channel resources reserved by the base station for the first subframe set. Then, the first user equipment obtains, according to the mapping labels and the offset value $N_{PUCCH}^{(1)}$ acknowledgement channel resources reserved by the base station, where acknowledgement channel resources obtained for subframes with the same mapping label completely or partly overlap.

Figure 7:
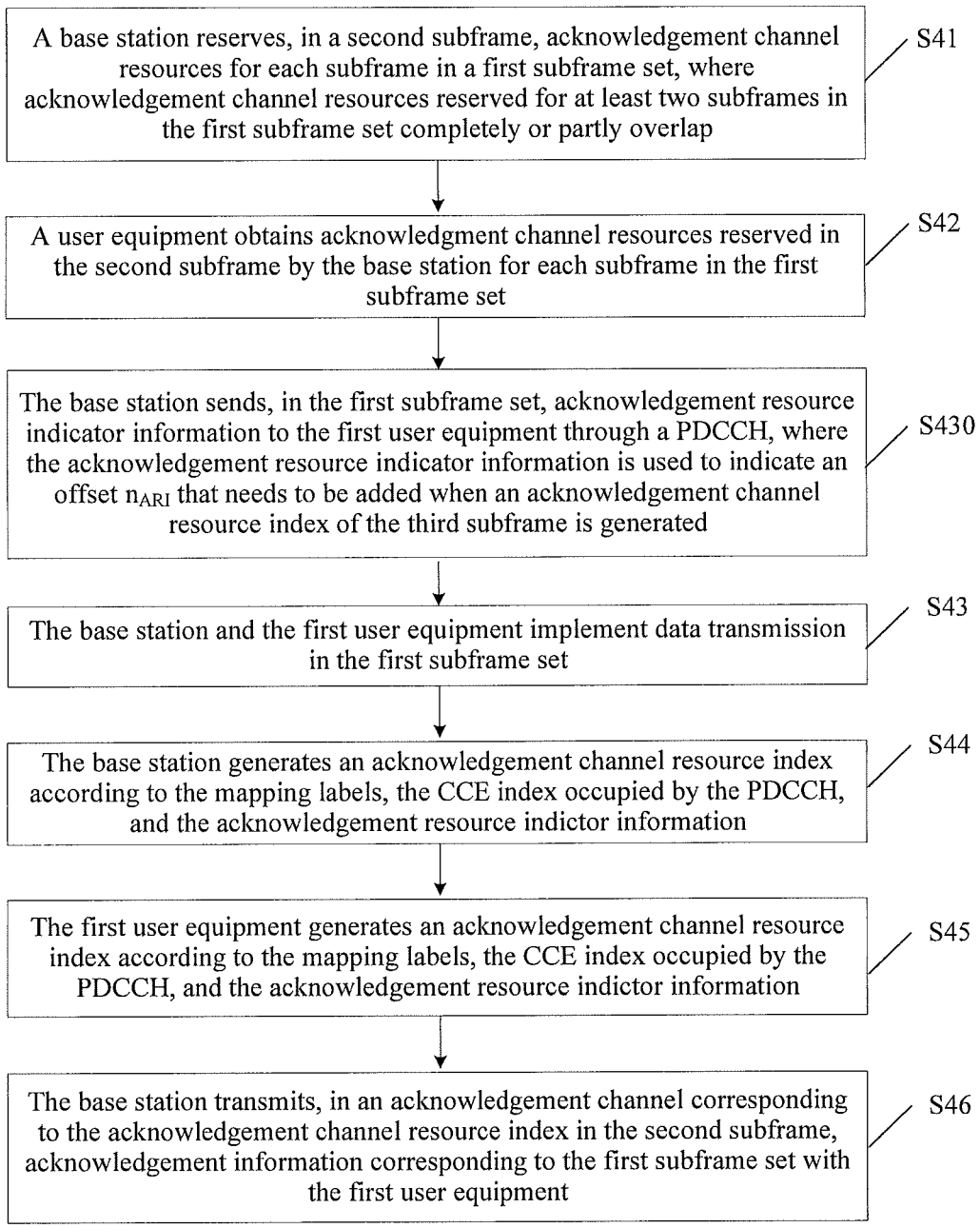
FIG. 7 is a flowchart of a time division duplex TDD communication method according to another embodiment of the present invention.

FIG. 7 is a flowchart of a time division duplex TDD communication method according to another embodiment of the present invention. The method provided in this embodiment is basically the same as the method provided in the embodiment shown in FIG. 6, with a difference only in the following: Before step S43, the method further includes step S430; and after step S43, the method further includes step S44 and step S45. Specifically, the method provided in this embodiment includes:

Step S41 and step S42 are not further described.

Step S430: The base station sends, in the first subframe set, acknowledgement resource indicator (ACK resource indicator, ART) information to the first user equipment through a physical downlink control channel (Physical Downlink Control Channel, PDCCH), where the acknowledgement resource indicator information is used to indicate an offset $n_{ARI}$ that needs to be added when an acknowledgement channel resource index of the third subframe is generated.

In an implementation manner of this embodiment, the acknowledgement channel resource index is an index of an acknowledgement channel specifically allocated for the base station and the first user equipment to transmit acknowledgment information in the second subframe. An acknowledgement channel specifically allocated to each subframe may be allocated from acknowledgment channel resources reserved for the each subframe. The base station and the first user equipment need to obtain the acknowledgement channel index respectively by computation in the same manner.

All subframes except the third subframe in the first subframe set have different mapping labels m. When a control channel element (Control Channel Element, CCE) resource index occupied by the PDCCH in each subframe in the first subframe set is $n_{CCE}$, the acknowledgement channel resource index is marked as $n_{PUCCH}^{(1)}$. In this case, the process of allocating acknowledgement channels is as follows: Firstly, a p value is selected from $\{0, 1, 2, 3\}$ to ensure $N_p \leq n_{CCE} < N_{p+1}$; then, the acknowledgement channel resource index can be obtained by computation by using formula 1: $n_{PUCCH}^{(1)} = (M-m-1) \times N_p + m \times N_{p+1} + n_{CCE} + N_{PUCCH}^{(1)}$, where $N_p = \max\{0, \ [[N_{RB}^{DL} \times (12 \times p - 4)]/36]\}$, $N_{RB}^{DL}$ represents a downlink system bandwidth, and $N_{PUCCH}^{(1)}$ represents a start position or an end position of acknowledgement channel resources reserved by the base station for the first subframe set.

The mapping label of the third subframe is the same as the mapping label of one subframe in the subset part. Therefore, for subframes with the same mapping label, if an allocated acknowledgement channel resource index is still obtained by computation according to formula 1 and the PDCCH occupies the same CCE resource in the two subframes, the same acknowledgement channel index result may be obtained, and then an acknowledgement channel resource collision occurs between subframes. Therefore, to avoid the acknowledgement channel resource collision, an offset n needs to be added to the third subframe, and further an acknowledgement channel resource index of the third subframe is obtained by computation by using formula 2:

$$n_{PUCCH}^{(1)} = (M-m-1) \times N_p + m \times N_{p+1} + n_{CCE} + n_{ARI} + N_{PUCCH}^{(1)}.$$

Because the first user equipment also needs to compute the acknowledgement channel index, the base station needs to notify the offset to the first user equipment. In an implementation manner of this embodiment, control information sent, through the PDCCH in the first subframe set, by the base station to the first user equipment includes a transmit power control (Transmission Power Control, TPC) field and a downlink assignment index (Downlink Assignment Index, DAI) field. The DAI field is used for cumulative counting of sent PDCCHs in the first subframe set according to the sequence of subframes. The DAI field is formed by two bits, and the value of the DAI field may be 1, 2, 3, or 4. For control information sent in a plurality of subframes with the same mapping label, when the value of the DAI field is equal to 1, the TPC field is set to transmit power control; when the value of the DAI field is greater than 1, the TPC field is set to an acknowledgement resource indictor.

For example, as shown in FIG. 2a, assuming that mapping labels m of subframe 4, subframe 5, subframe 6, and subframe 8 are all zero, values of the DAI fields of subframe 5, subframe 6, subframe 7, and subframe 8 are all greater than 1, and the TPC field is set to acknowledgement resource indicator information, where the acknowledgement resource indicator information is used to indicate the offset $n_{ARI}$.

Step S43 is not further described.

Step S44: The base station generates an acknowledgement channel resource index according to the mapping labels, the CCE index occupied by the PDCCH, and the acknowledgement resource indictor information.

It should be noted herein that before performing step S430, the base station needs to determine a CCE index occupied by the PDCCH, and then sends, in the determined CCE index, acknowledgement resource indicator information to the first user equipment. Therefore, after determining the CCE index occupied by the PDCCH, the base station can perform step S44. In this case, step S44 and step S430 and/or step S43 may be performed concurrently.

The process of generating an acknowledgement channel resource index by the base station is detailed in the description of step S430, which is incorporated herein by reference and not further described.

Step S45: The first user equipment generates an acknowledgement channel resource index according to the mapping labels, the CCE index occupied by the PDCCH, and the acknowledgement resource indictor information.

It should be noted herein that when the first user equipment receives control information sent by the PDCCH, the first user equipment may detect a CCE index occupied by the PDCCH, and then generate an acknowledgement channel resource index according to the CCE index occupied by the PDCCH. Therefore, step S45 may be performed after step S430. Of course, step S45 and step S43 may also be performed concurrently.

The process of generating an acknowledgement channel resource index by the first user equipment is detailed in the description of step S430, which is incorporated herein by reference and not further described.

Step S46: The base station transmits, in an acknowledgement channel corresponding to the acknowledgement channel resource index in the second subframe, acknowledgement information corresponding to the first subframe set with the first user equipment.

Figure 8:
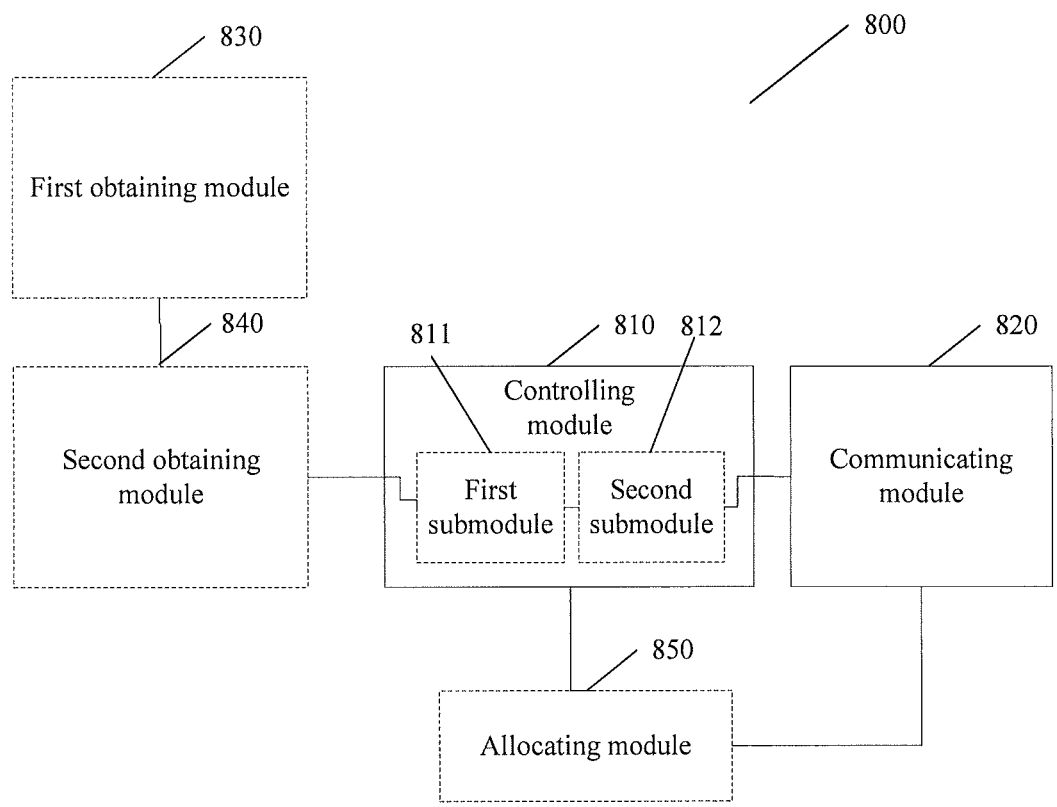
FIG. 8 is a schematic modular diagram of a base station according to an embodiment of the present invention.

FIG. 8 is a schematic modular diagram of a base station according to an embodiment of the present invention. The base station provided in this embodiment is configured to implement the method provided in the foregoing embodiments. Therefore, the descriptions of the method provided in the foregoing embodiments and the implementation manners of the method are also applicable to the base station provided in this embodiment. The base station 800 includes a controlling module 810 and a communicating module 820. The controlling module 810 is configured to reserve, in a second subframe, acknowledgement channel resources for each subframe in a first subframe set, where acknowledgement channel resources reserved for at least two subframes in the first subframe set completely or partly overlap. The communicating module 820 is configured to transmit, in the first subframe set, data with a first user equipment.

In an implementation manner of this embodiment, the controlling module 810 is specifically configured to reserve, in the second subframe, acknowledgement channel resources for each subframe in the first subframe set, where the first subframe set includes a subset part and a complement part, acknowledgement channel resources reserved for the complement part completely or partly overlap with acknowledgement channel resources reserved for the subset part, and when the subset part includes more than one subframe, acknowledgement channel resources reserved by the base station for each subframe in the subset part do not mutually overlap.

In another implementation manner of this embodiment, the base station 800 further includes a first obtaining module 830 and a second obtaining module 840. The first obtaining module 830 is configured to obtain a first subframe ratio and a second subframe ratio. The second obtaining module 840 is configured to obtain the first subframe set and the second subframe according to the first subframe ratio, and obtain the subset part and the complement part according to the first subframe ratio and the second subframe ratio.

In another implementation manner of this embodiment, the communicating module 820 is further configured to transmit, in the subset part, data with a second user equipment, and transmit, in the second subframe, acknowledgement information corresponding to the subset part with the second user equipment.

In another implementation manner of this embodiment, the communicating module 820 is further configured to notify the first subframe ratio to the first user equipment, and notify the second subframe ratio to the second user equipment, so that the first user equipment communicates with the base station according to the first subframe ratio and that the second user equipment communicates with the base station according to the second subframe ratio.

In another implementation manner of this embodiment, the first obtaining module 830 is specifically configured to obtain a first subframe ratio and a second subframe ratio, where the first subframe ratio and the second subframe ratio respectively include uplink subframes, downlink subframes, and special subframes, where the number of uplink subframes in the first subframe ratio is smaller than the number of uplink subframes in the second subframe ratio. Or, the first obtaining module 830 is specifically configured to obtain a first subframe ratio and a second subframe ratio, where the first subframe ratio includes uplink subframes, downlink subframes, special subframes, and flexible subframes, the second subframe ratio includes uplink subframes, downlink subframes, and special subframes, the complement part includes the flexible subframes, and the subset part includes the uplink subframes, or the downlink subframes, or the downlink subframes and the special subframes.

In another implementation manner of this embodiment, the controlling module 810 includes a first submodule 811 and a second submodule 812. The first submodule 811 is configured to obtain mapping labels of each subframe in the first subframe set, where the first subframe set includes a subset part and a complement part, where the complement part includes at least one third subframe, a mapping label of the third subframe is the same as a mapping label of one subframe in the subset part, and mapping labels of each subframe in the subset part are mutually different. The second submodule 812 is configured to reserve, in the second subframe, acknowledgement channel resources for each subframe in the first subframe set according to the mapping labels, where acknowledgement channel resources reserved for subframes with the same mapping label completely or partly overlap.

In another implementation manner of this embodiment, the communicating module 820 is further configured to send, in the first subframe set, acknowledgement resource indicator information to the first user equipment through a physical downlink control channel PDCCH, where the acknowledgement resource indicator information is used to indicate an offset that needs to be added when an acknowledgement channel resource index of the third subframe is generated.

In another implementation manner of this embodiment, the base station further includes an allocating module 850 configured to generate an acknowledgement channel resource index according to the mapping labels, a control channel element CCE index occupied by the PDCCH, and the acknowledgement resource indicator information.

The communicating module 820 is further configured to transmit, in an acknowledgement channel corresponding to the acknowledgement channel resource index in the second subframe, acknowledgement information corresponding to the first subframe set with the first user equipment.

In another implementation manner of this embodiment, the communicating module 820 being further configured to send, in the first subframe set, acknowledgement resource indicator information to the first user equipment through a physical downlink control channel PDCCH specifically includes: the communicating module 820 being further configured to send, in the first subframe set, control information to the first user equipment through the PDCCH, where the control information includes a transmit power control TPC field and a downlink assignment index DAI field, where in the control information sent in subframes starting from a second subframe in each group of subframes with the same mapping label, when a value of the DAI field is equal to 1, the TPC field is set to transmit power control, and when the value of the DAI field is greater than 1, the TPC field is set to acknowledgement resource indicator information.

Figure 9:
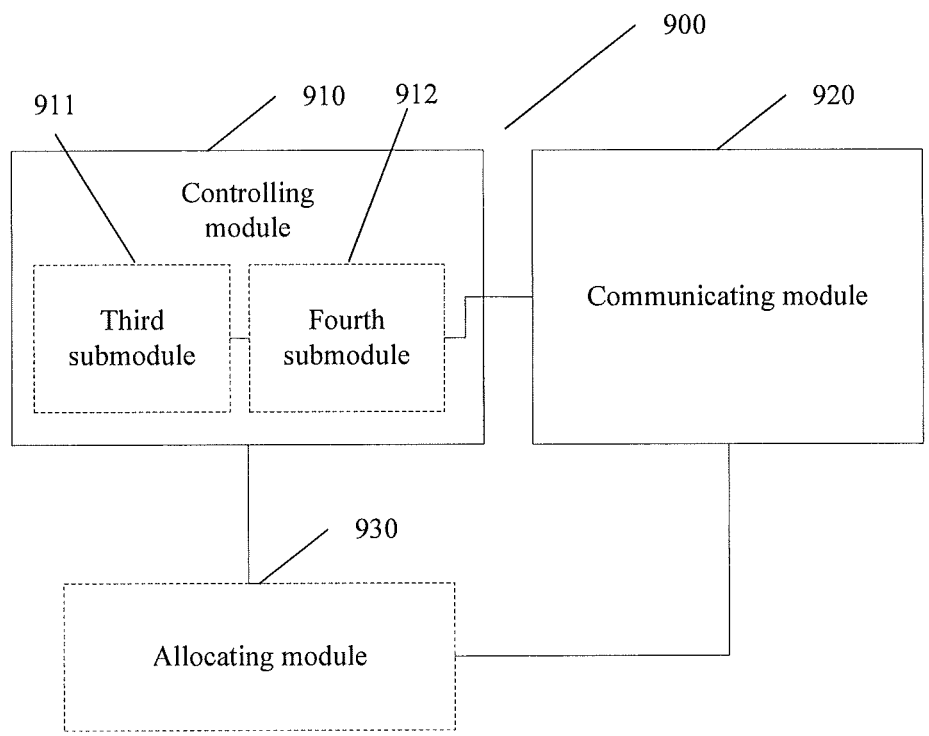
FIG. 9 is a schematic modular diagram of a user equipment according to an embodiment of the present invention.

FIG. 9 is a schematic modular diagram of a user equipment according to an embodiment of the present invention. The user equipment provided in this embodiment is configured to implement the method provided in the foregoing embodiments. Therefore, the descriptions of the method provided in the foregoing embodiments and the implementation manners of the method are also applicable to the user equipment provided in this embodiment. The user equipment 900 includes a controlling module 910 and a communicating module 920. The controlling module 910 is configured to obtain acknowledgement channel resources reserved in a second subframe by a base station for each subframe in a first subframe set, where acknowledgement channel resources reserved for at least two subframes in the first subframe set completely or partly overlap. The communicating module 920 is configured to transmit, in the first subframe set, data with the base station.

In an implementation manner of this embodiment, the controlling module 910 is specifically configured to obtain acknowledgement channel resources reserved in the second subframe by the base station for each subframe in the first subframe set, where the first subframe set includes a subset part and a complement part, acknowledgement channel resources reserved for the complement part completely or partly overlap with acknowledgment channel resources reserved for the subset part, and when the subset part includes more than one subframe, acknowledgement channel resources reserved by the base station for each subframe in the subset part do not mutually overlap.

In another implementation manner of this embodiment, the communicating module 920 is further configured to receive a first subframe ratio and a second subframe ratio notified by the base station. The controlling module 910 is further configured to obtain the first subframe set and the second subframe according to the first subframe ratio, and obtain the subset part and the complement part according to the first subframe ratio and the second subframe ratio.

In another implementation manner of this embodiment, the communicating module 920 being further configured to receive a first subframe ratio and a second subframe ratio notified by the base station specifically includes: the communicating module 920 being further configured to receive a first subframe ratio and a second subframe ratio notified by the base station, where the first subframe ratio includes uplink subframes, downlink subframes, special subframes, and flexible subframes, the second subframe ratio includes uplink subframes, downlink subframes, and special subframes, the complement part includes the flexible subframes, and the subset part includes the uplink subframes, or the downlink subframes, or the downlink subframes and the special subframes; or the first subframe ratio and the second subframe ratio respectively include uplink subframes, downlink subframes, and special subframes, where the number of uplink subframes in the first subframe ratio is smaller than the number of uplink subframes in the second subframe ratio.

In another implementation manner of this embodiment, the controlling module 910 includes a third submodule 911 and a fourth submodule 912. The third submodule 911 is configured to obtain mapping labels of each subframe in the first subframe set, where the first subframe set includes a subset part and a complement part, where the complement part includes at least one third subframe, a mapping label of the third subframe is the same as a mapping label of one subframe in the subset part, and mapping labels of each subframe in the subset part are mutually different. The fourth submodule 912 is configured to obtain, according to the mapping labels, acknowledgement channel resources reserved in the second subframe for each subframe in the first subframe set, where acknowledgement channel resources reserved for subframes with the same mapping label completely or partly overlap.

Figure 10:
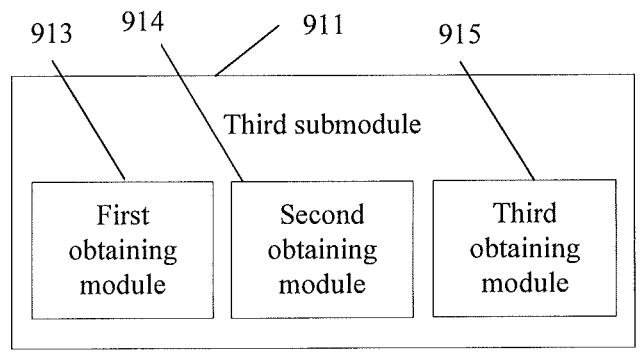
FIG. 10 is a schematic modular diagram of a third submodule shown in FIG. 9 in this implementation manner.

In another implementation manner of this embodiment, reference may be made to FIG. 10. FIG. 10 is a schematic modular diagram of the third submodule shown in FIG. 9 in this implementation manner. The third submodule 911 includes: a first obtaining module 913, configured to read mapping labels pre-configured for each subframe in the first subframe set; or a second obtaining module 914, configured to receive, through the communicating module, a mapping label allocated to at least one subframe in the first subframe set and notified by the base station; or a third obtaining module 915, configured to read mapping labels pre-configured for the subset part of the first subframe set, and receive, through the communicating module, mapping labels allocated to the complement part of the first subframe set and notified by the base station.

In another implementation manner of this embodiment, the communicating module 920 is further configured to receive acknowledgement resource indicator information sent by the base station through a physical downlink control channel PDCCH in the first subframe set, where the acknowledgement resource indicator information is used to indicate an offset that needs to be added when an acknowledgement channel resource index of the third subframe is generated.

In another implementation manner of this embodiment, the user equipment 900 further includes an allocating module 930 configured to generate an acknowledgement channel resource index according to the mapping labels, a control channel element CCE index occupied by the PDCCH, and the acknowledgement resource indicator information.

The communicating module 920 is further configured to transmit, in an acknowledgment channel corresponding to the acknowledgment channel resource index in the second subframe, acknowledgment information corresponding to the transmission of the first subframe set with the base station.

In another implementation manner of this embodiment, the communicating module 920 being further configured to receive acknowledgement resource indicator information sent by the base station through a physical downlink control channel PDCCH in the first subframe set specifically includes: the communicating module 920 being further configured to receive, through the PDDCH in the first subframe set, control information sent by the base station, where the control information includes a transmit power control TPC field and a downlink assignment index DAI field, where in the control information received in subframes starting from a second subframe in each group of subframes with the same mapping label, when a value of the DAI field is equal to 1, the TPC field is parsed into transmit power control, and when the value of the DAI field is greater than 1, the TPC field is parsed into an acknowledgement resource indicator.

It should be finally noted that a person of ordinary skill in the art should understand that all or part of the processes of the methods in the embodiments may be implemented by a computer program instructing relevant hardware. The program may be stored in a computer readable storage medium. When the program runs, it may include the processes of the methods in the foregoing embodiments. The storage medium may be a magnetic disk, an optical disk, a read-only memory (ROM) or a random access memory (RAM).

Functional units in the embodiments of the present invention may be integrated into a processing module, or each of units may exist alone physically, or two or more units are integrated into a module. The integrated modules may be implemented in a form of hardware, or may be implemented in a form of software functional modules. When being implemented in a form of software functional modules and sold or used as an independent product, the integrated modules may also be stored in a computer readable storage medium. The foregoing storage medium may be a read-only memory, a magnetic disk or an optical disk. The foregoing apparatuses and systems may perform the methods described in the method embodiments.

The foregoing descriptions are only exemplary embodiments of the present invention, but are not intended to limit the present invention. Any modification, equivalent replacement, or improvement derived within the spirit and principle of the present invention shall fall within the protection scope of the present invention.

What is claimed is:

1. A time division duplex TDD communication method, comprising:
reserving, by a base station, a second subframe in a second subframe set, for acknowledgement channel resources for subframes in a first subframe set, wherein the reserved acknowledgement channel resources for the second subframe completely or partly overlap at least two subframes in the first subframe set; and
transmitting, by the base station, in the first subframe set, data to a first user equipment.

2. The method according to claim 1, wherein:
the first subframe set comprises a subset part and a complement part, and
the reserving the acknowledgement channel resources includes acknowledgement channel resources reserved for the complement part that completely or partly overlap with acknowledgement channel resources reserved for the subset part, and when the subset part comprises more than one subframe, acknowledgement channel resources reserved by the base station for each subframe in the subset part do not mutually overlap.

3. The method according to claim 2, further comprising:
obtaining, by the base station, information indicative of a first subframe ratio of types of subframes included in the first subframe set and a second subframe ratio of types of subframes included in the second subframe set; and
obtaining, by the base station, the first subframe set and the second subframe set according to the first subframe ratio, and obtaining the subset part and the complement part according to the first subframe ratio and the second subframe ratio.

4. The method according to claim 3, further comprising:
transmitting, by the base station, in the subset part, data to a second user equipment; and
transmitting, by the base station, in the second subframe, acknowledgement information corresponding to the subset part to the second user equipment.

5. The method according to claim 3, further comprising:
notifying, by the base station, the first subframe ratio to the first user equipment, so that the first user equipment communicates with the base station according to the first subframe ratio; and
notifying, by the base station, the second subframe ratio to the second user equipment, so that the second user equipment communicates with the base station according to the second subframe ratio.

6. The method according to claim 3, wherein:
the first subframe ratio and the second subframe ratio each comprise the types of subframes of uplink subframes, downlink subframes, and special subframes, wherein a number of uplink subframes in the first subframe ratio is smaller than a number of uplink subframes in the second subframe ratio; or
the first subframe ratio comprises the types of subframes of uplink subframes, downlink subframes, special subframes, and flexible subframes, the second subframe ratio comprises uplink subframes, downlink subframes, and special subframes, the complement part comprises the flexible subframes, and the subset part comprises the uplink subframes, or the downlink subframes, or both the downlink subframes and the special subframes.

7. The method according to claim 2, wherein the reserving the acknowledgement channel resources for the subset part and the complement part in the first subframe set comprises:
obtaining, by the base station, mapping labels of the subframes in the first subframe set, wherein the first subframe set comprises the subset part and the complement part, wherein the complement part comprises at least one third subframe, a mapping label of the third subframe is same as a mapping label of one subframe in the subset part, and mapping labels of subframes in the subset part are mutually different; and
reserving, by the base station, in the second subframe, acknowledgement channel resources for the subframes in the first subframe set according to the mapping labels, wherein acknowledgement channel resources reserved for subframes with same mapping label completely or partly overlap.

8. A time division duplex TDD communication method, comprising:
obtaining, by a user equipment, acknowledgement channel resources reserved, by a base station, in a second subframe in a second subframe set for subframes in a first subframe set, wherein the reserved acknowledgement channel resources for the second subframe completely or partly overlap at least two subframes in the first subframe set; and
transmitting, by the user equipment, in the first subframe set, data to the base station.

9. The method according to claim 8, wherein:
the first subframe set comprises a subset part and a complement part, and
the obtaining the reserved acknowledgement channel resources includes acknowledgement channel resources reserved for the complement part that completely or partly overlap with acknowledgement channel resources reserved for the subset part, and when the subset part comprises more than one subframe, acknowledgement channel resources reserved by the base station for each subframe in the subset part do not mutually overlap.

10. The method according to claim 9, further comprising:
receiving, by the user equipment, notification by the base station of information indicative of a first subframe ratio of types of subframes included in the first subframe set and a second subframe ratio of types of subframes included in the second subframe set; and
obtaining, by the user equipment, the first subframe set and the second subframe according to the first subframe ratio, and obtaining the subset part and the complement part according to the first subframe ratio and the second subframe ratio.

11. The method according to claim 10, wherein:
the first subframe ratio comprises the types of subframes of uplink subframes, downlink subframes, special subframes, and flexible subframes, the second subframe ratio comprises the types of subframes of uplink subframes, downlink subframes, and special subframes, the complement part comprises the flexible subframes, and the subset part comprises the uplink subframes, or the downlink subframes, or the downlink subframes and the special subframes; or
the first subframe ratio and the second subframe ratio respectively comprise the types of subframes of uplink subframes, downlink subframes, and special subframes, wherein a number of uplink subframes in the first subframe ratio is smaller than a number of uplink subframes in the second subframe ratio.

12. The method according to claim 9, wherein the obtaining the acknowledgement channel resources for the subset part and the complement part in the first subframe set comprises:
obtaining, by the user equipment, mapping labels of the subframes in the first subframe set, wherein the first subframe set comprises a subset part and the complement part, wherein the complement part comprises at least one third subframe, a mapping label of the third subframe is same as a mapping label of one subframe in the subset part, and mapping labels of subframes in the subset part are mutually different; and
obtaining, by the user equipment, according to the mapping labels, acknowledgement channel resources reserved in the second subframe for the subframes in the first subframe set, wherein acknowledgement channel resources reserved for subframes with same mapping label completely or partly overlap.

13. The method according to claim 12, wherein the obtaining, by the user equipment, mapping labels allocated to the subframes in the first subframe set comprises:
reading, by the user equipment, mapping labels pre-configured for the subframes in the first subframe set; or
receiving, by the user equipment, a mapping label allocated to at least one subframe in the first subframe set and notified by the base station; or
reading, by the user equipment, mapping labels pre-configured for the subset part of the first subframe set, and receiving mapping labels allocated to the complement part of the first subframe set and notified by the base station.

14. A user equipment, comprising:
a controlling module, configured to obtain acknowledgement channel resources reserved, by a base station, in a second subframe in a second subframe set for subframes in a first subframe set, wherein the reserved acknowledgement channel resources for the second subframe completely or partly overlap at least two subframes in the first subframe set; and
a communicating module, configured to transmit, in the first subframe set, data to the base station.

15. The user equipment according to claim 14, wherein:
the first subframe set comprises a subset part and a complement part, and
the obtained reserved acknowledgement channel resources includes acknowledgement channel resources reserved for the complement part that completely or partly overlap with acknowledgement channel resources reserved for the subset part, and when the subset part comprises more than one subframe, acknowledgement channel resources reserved by the base station for each subframe in the subset part do not mutually overlap.

16. The user equipment according to claim 15, wherein:
the communicating module is further configured to receive notification by the base station of information indicative of a first subframe ratio of types of subframes included in the first subframe set and a second subframe ratio of types of subframes included in the second subframe set; and
the controlling module is further configured to obtain the first subframe set and the second subframe according to the first subframe ratio, and obtain the subset part and the complement part according to the first subframe ratio and the second subframe ratio.

17. The user equipment according to claim 16,
wherein the first subframe ratio comprises the types of subframes of uplink subframes, downlink subframes, special subframes, and flexible subframes, the second subframe ratio comprises the types of subframes of uplink subframes, downlink subframes, and special subframes, the complement part comprises the flexible subframes, and the subset part comprises the uplink subframes, or the downlink subframes, or the downlink subframes and the special subframes; or
the first subframe ratio and the second subframe ratio respectively comprise the types of subframes of uplink subframes, downlink subframes, and special subframes, and a number of uplink subframes in the first subframe ratio is smaller than a number of uplink subframes in the second subframe ratio.

18. The user equipment according to of claim 14, wherein the controlling module comprises:
a first submodule, configured to obtain mapping labels of the subframes in the first subframe set, wherein the first subframe set comprises a subset part and the complement part, wherein the complement part comprises at least one third subframe, a mapping label of the third subframe is same as a mapping label of one subframe in the subset part, and mapping labels of the subframes in the subset part are mutually different; and
a second submodule, configured to obtain, according to the mapping labels, acknowledgement channel resources reserved in the second subframe for the subframes in the first subframe set, wherein acknowledgement channel resources reserved for subframes with same mapping label completely or partly overlap.

19. The user equipment according to claim 18, wherein the first submodule comprises:
- a first obtaining module, configured to read mapping labels pre-configured for the subframes in the first subframe set; or
- a second obtaining module, configured to receive, through the communicating module, a mapping label allocated to at least one subframe in the first subframe and notified by the base station; or
- a third obtaining module, configured to read mapping labels pre-configured for the subset part of the first subframe set, and receive, through the communicating module, mapping labels allocated to the complement part of the first subframe set and notified by the base station.

20. The user equipment according to claim 18, wherein:
- the communicating module is further configured to receive acknowledgement resource indicator information sent by the base station through a physical downlink control channel PDCCH in the first subframe set, wherein the acknowledgement resource indicator information is used to indicate an offset that needs to be added when an acknowledgement channel resource index of the third subframe is generated.

* * * * *